(12) United States Patent
Yoon et al.

(10) Patent No.: US 10,587,869 B2
(45) Date of Patent: Mar. 10, 2020

(54) IMAGE DISPLAY APPARATUS AND OPERATING METHOD THEREOF

(71) Applicant: SAMSUNG ELECTRONICS CO., LTD., Suwon-si, Gyeonggi-do (KR)

(72) Inventors: Hyun-don Yoon, Pohang-si (KR); A-in Cho, Suwon-si (KR); Sang-chul Ko, Seongnam-si (KR); Joung-ho Roh, Suwon-si (KR); Bong-seok Lee, Suwon-si (KR); Sang-moon Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 17 days.

(21) Appl. No.: 15/672,492

(22) Filed: Aug. 9, 2017

(65) Prior Publication Data
US 2018/0048886 A1 Feb. 15, 2018

(30) Foreign Application Priority Data

Aug. 12, 2016 (KR) .................. 10-2016-0103208

(51) Int. Cl.
| | | |
|---|---|---|
| *H04N 13/388* | (2018.01) | |
| *H04N 21/81* | (2011.01) | |
| *H04N 21/43* | (2011.01) | |
| *H04N 21/4728* | (2011.01) | |
| *H04N 21/41* | (2011.01) | |
| *G06T 15/10* | (2011.01) | |

(Continued)

(52) U.S. Cl.
CPC ......... *H04N 13/388* (2018.05); *G06F 3/1438* (2013.01); *G06T 15/04* (2013.01);
(Continued)

(58) Field of Classification Search
CPC ............... H04N 13/388; H04N 13/189; H04N 21/4122; H04N 21/4307; H04N 21/4728;
(Continued)

(56) References Cited

U.S. PATENT DOCUMENTS 9,342,911 B1 * 5/2016 Sheridan .................. G06T 5/50
2008/0066000 A1 3/2008 Ofek et al.
(Continued)

FOREIGN PATENT DOCUMENTS

EP 2 874 047 A2 5/2015
JP 2003-219403 7/2003
(Continued)

OTHER PUBLICATIONS

Search Report and Written Opinion dated Nov. 17, 2017 in counterpart International Patent Application No. PCT/KR2017/008718.
(Continued)

*Primary Examiner* — Sarah Lhymn
(74) *Attorney, Agent, or Firm* — Nixon & Vanderhye P.C.

(57) ABSTRACT

A method performed by a first image display apparatus includes: obtaining a 360-degree image; displaying, on a first display included in the first image display apparatus, a first image corresponding to a first area of the 360-degree image; controlling a second image display apparatus to display a second image corresponding to a second area of the 360-degree image, the second area being adjacent to the first area.

17 Claims, 13 Drawing Sheets

(51) Int. Cl.
*G06F 3/14* (2006.01)
*G09G 3/00* (2006.01)
*H04N 13/189* (2018.01)
*G06T 15/04* (2011.01)
*G06T 15/20* (2011.01)
*H04N 21/80* (2011.01)

(52) U.S. Cl.
CPC .............. *G06T 15/10* (2013.01); *G06T 15/20* (2013.01); *G09G 3/002* (2013.01); *H04N 13/189* (2018.05); *H04N 21/4122* (2013.01); *H04N 21/4307* (2013.01); *H04N 21/4728* (2013.01); *H04N 21/80* (2013.01); *H04N 21/816* (2013.01); *G09G 2340/045* (2013.01); *G09G 2340/0407* (2013.01); *G09G 2354/00* (2013.01)

(58) Field of Classification Search
CPC ...... H04N 21/80; H04N 21/816; G06T 15/10; G06T 15/20
USPC .......................... 345/418, 419, 619
See application file for complete search history.

(56) References Cited

U.S. PATENT DOCUMENTS

| | | |
|---|---|---|
| 2012/0194734 A1 | 8/2012 | McConnville et al. |
| 2013/0322843 A1 | 12/2013 | Suzuki et al. |
| 2014/0009394 A1* | 1/2014 | Lee ..................... H04N 5/4403 345/157 |
| 2016/0155410 A1 | 6/2016 | Nam |
| 2016/0191893 A1* | 6/2016 | Gewickey ........... H04N 13/025 386/223 |
| 2016/0353089 A1* | 12/2016 | Gallup ............... G02B 27/0172 |

FOREIGN PATENT DOCUMENTS

| | | | |
|---|---|---|---|
| JP | 2005-056295 | | 3/2005 |
| JP | 2005056295 A | * | 3/2005 |
| KR | 10-2007-0103347 | | 10/2007 |
| KR | 10-1530826 | | 6/2015 |
| KR | 10-2016-0052095 | | 5/2016 |
| KR | 20160052095 A | * | 5/2016 |

OTHER PUBLICATIONS

European Extended Search Report dated Mar. 14, 2019 for EP Application No. 17839846.7.

Jo et al., "Proposal for Multi-Device Presentation Support in MMT-C1"; ISO/IEC JTC1/SC29/WG11, Oct. 2012.

D'Acunto et al., "MPD Signalling of 360 Content Properties for VR Applications", ISO/IEC JTC1/SC29/WG11 MPEG2016/m38605, May 2016.

European Office Action dated Nov. 8, 2019 for EP Application No. 17839846.7.

* cited by examiner

IMAGE DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2016-0103208, filed on Aug. 12, 2016, in the Korean Intellectual Property Office, the disclosure of which is incorporated by reference herein in its entirety.

BACKGROUND

1. Field

The present disclosure relates generally to an image display apparatus and an operating method thereof, and for example, to an image display apparatus displaying a 360-degree image and an operating method thereof.

2. Description of Related Art

An image display apparatus is an apparatus having a function of displaying an image which may be seen by a user. The user may view broadcasting programs via the image display apparatus. The image display apparatus displays on a display thereof a broadcasting program corresponding to a broadcasting signal that a user selects from among broadcasting signals transmitted from broadcasting stations. Currently, the conversion of broadcasting systems from analog broadcasting to digital broadcasting is a global trend.

Digital broadcasting refers to broadcasting that transmits digital image signals and digital sound signals. Digital broadcasting has less data loss that analog broadcasting because it is less vulnerable to external noises, is easy to correct errors, has high resolution, and provides a vivid screen. Also, unlike analog broadcasting, digital broadcasting can provide a bi-directional service.

Recently, smart televisions (TVs) providing various content in addition to a digital broadcasting function have been distributed, along with image display apparatuses capable of displaying a 360-degree image have been provided. Accordingly, there is required a method for a user to conveniently watch the 360-degree image.

SUMMARY

An image display apparatus displaying a 360-degree image and an operating method thereof are provided.

Additional aspects will be set forth in part in the description which follows and, in part, will be apparent from the description.

According to an aspect of an example embodiment, a method performed by a first image display apparatus includes: obtaining a 360-degree image; displaying, on a first display included in the first image display apparatus, a first image corresponding to a first area of the 360-degree image; and controlling a second image display apparatus to display a second image corresponding to a second area of the 360-degree image, the second area being adjacent to the first area.

The controlling of the second image display apparatus to display the second image may include transmitting the 360-degree image and area extraction information to the second image display apparatus or a server, and the second image may be an image extracted from the 360-degree image by the second image display apparatus or the server, based on the area extraction information.

The area extraction information may include at least one of: location information of the first area, size information of the first area, display magnification information of the first area, reproduction point information of the first area of the 360-degree image, the first area being displayed on the first display, and information regarding an area adjacent to the first area.

The method may further include changing at least one of: a location, a size, and a display magnification of the first area, based on an input (e.g., a user input) with respect to the first area of the 360-degree image, and displaying the first image on the first display based on the changes to the first area; and controlling the second image display apparatus to set an area adjacent to the changed first area as the second area and to display a second image corresponding to the changed second area.

The obtaining of the 360-degree image may include receiving the 360-degree image from a server, and the 360-degree image received from the server may be a planar 360-degree image generated by mapping a sphere-shaped 360-degree image to a planar shape.

The obtaining of the 360-degree image may further include restoring the planar 360-degree image to the sphere-shaped 360-degree image and extracting the first image corresponding to the first area.

The method may further include reproducing the 360-degree image, and outputting audio in synchronization with a reproduction point of the 360-degree image.

The outputting of the audio may include reconstructing an audio signal to be output via at least one speaker included in the first image display apparatus and at least one speaker included in the second image display apparatus, based on at least one of: location information of the at least one speaker included in the first image display apparatus, location information of the at least one speaker included in the second image display apparatus, information of a user's viewpoint, and image information.

According to an aspect of another example embodiment, a first image display apparatus includes: a first display; and a controller configured to: obtain a 360-degree image, display, on the first display, a first image corresponding to a first area of the 360-degree image, and control a second image display apparatus to display a second image corresponding to a second area of the 360-degree image, the second area being adjacent to the first area.

The controller may further be configured to transmit the 360-degree image and area extraction information to the second image display apparatus or a server, and the second image may be an image extracted from the 360-degree image by the second image display apparatus or a server, based on the area extraction information.

The area extraction information may include at least one of: location information of the first area, size information of the first area, display magnification information of the first area, reproduction point information of the first area of the 360-degree image, the first area being displayed on the first display, and information regarding an area adjacent to the first area.

The controller may further be configured to change at least one of: a location, a size, and a display magnification of the first area, based on an input (e.g., a user input) with respect to the first area of the 360-degree image, and to display the first image on the first display based on the changes to the first area, and the controller may further be configured to control the second image display apparatus to set an area adjacent to the changed first area as the second area and to display a second image corresponding to the changed second area.

The controller may further be configured to receive the 360-degree image from a server, and the 360-degree image received from the server may be a planar 360-degree image generated by mapping a sphere-shaped 360-degree image to a planar shape.

The controller may further be configured to restore the planar 360-degree image to the sphere-shaped 360-degree image and to extract the first image corresponding to the first area.

The first image display apparatus may further include at least one speaker, and the controller may further be configured to: reproduce the 360-degree image, and output audio in synchronization with a reproduction point of the 360-degree image.

The controller may further be configured to reconstruct an audio signal to be output via the at least one speaker included in the first image display apparatus and at least one speaker included in the second image display apparatus, based on at least one of: location information of the at least one speaker included in the first image display apparatus, location information of the at least one speaker included in the second image display apparatus, information of a user's viewpoint, and image information.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
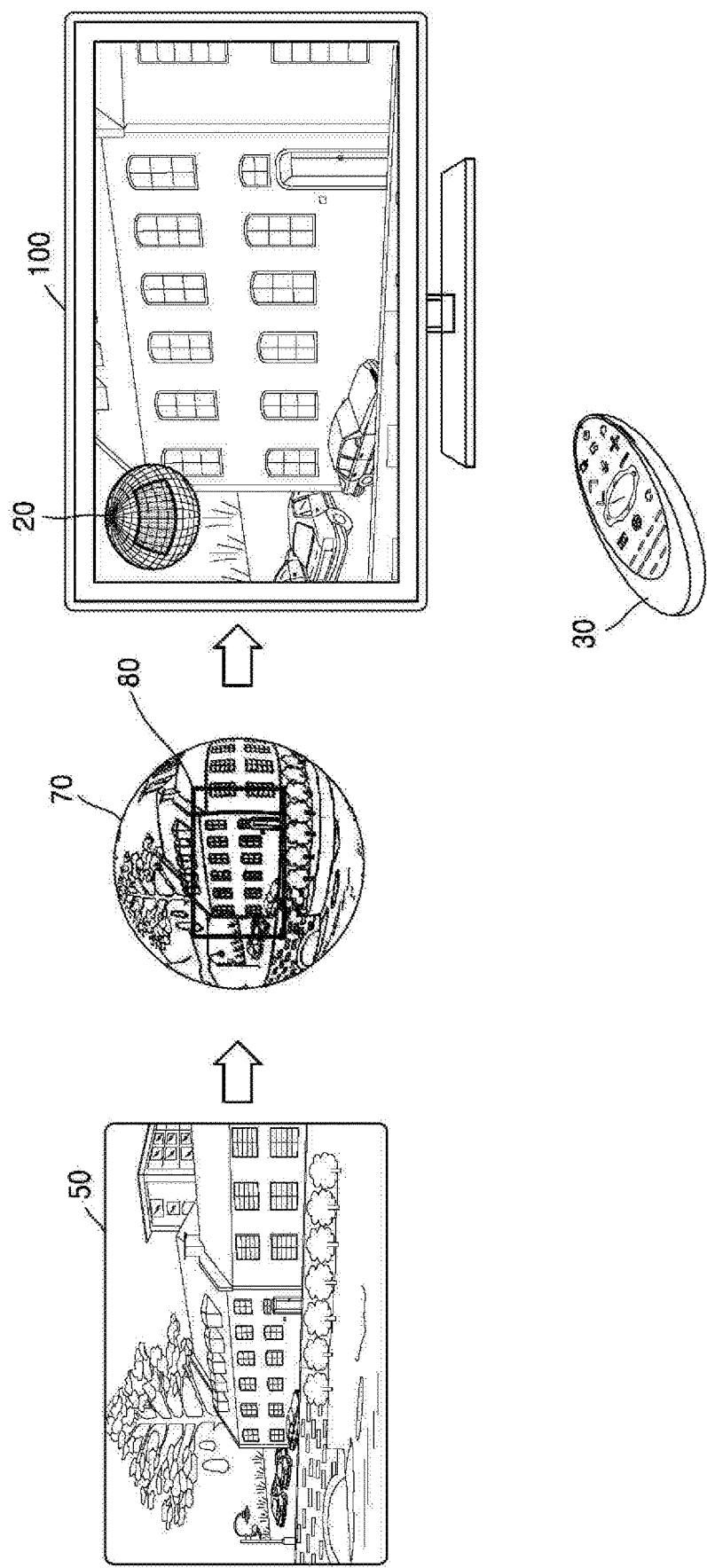
FIG. 1 is a diagram illustrating an example image display apparatus displaying a 360-degree image and a controller, according to an example embodiment.

Reference will now be made in greater detail to various example embodiments, examples of which are illustrated in the accompanying drawings, wherein like reference numerals refer to like elements throughout. In this regard, the present example embodiments may have different forms and should not be understood as being limited to the descriptions set forth herein. Accordingly, the various example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the present disclosure, when a part "includes" an element, it is to be understood that the part additionally includes other elements rather than excluding other elements as long as there is no particular opposing recitation. Also, the terms such as " . . . unit," "module," or the like used in the present disclosure indicate an unit, which processes at least one function or motion, and the unit may be implemented by hardware (e.g., circuitry) or software, or by a combination of hardware and software.

Hereinafter, the present disclosure will be described more fully with reference to the accompanying drawings, in which example embodiments of the disclosure are illustrated. The disclosure may, however, be embodied in many different forms and should not be understood as being limited to the embodiments set forth herein; rather these embodiments are provided so that this disclosure will be thorough and complete, and will convey the disclosure to one of ordinary skill in the art. In the drawings, like reference numerals denote like elements. Also, while describing the present disclosure, detailed descriptions about related well known functions or configurations that may obscure the points of the present disclosure may be omitted.

In this disclosure, the term "user" may refer, for example, to a person who controls a function or an operation of an image display apparatus by using a controller, and may include a viewer, a manager, or an installation engineer.

FIG. 1 is a diagram illustrating an example image display apparatus 100 displaying a 360-degree image and a controller 30 (e.g., a remote control), according to an example embodiment.

Referring to FIG. 1, the image display apparatus 100 according to an embodiment may display all or part of a 360-degree image. The 360-degree image according to an embodiment may be an image having a viewing angle that is 360 degrees. The 360-degree image may be a still image, a video, or a panorama image. For example, the 360-degree image may be an image generated based on a plurality of images photographed in a 360-degree direction using at least one camera. Here, the plurality of photographed images may be mapped to a sphere, and contacts of the mapped images may be stitched to generate a 360-degree image of a sphere shape. Also, the sphere-shaped 360-degree image may be transmitted to another device or stored by being converted to a planar 360-degree image 50 as illustrated in FIG. 1.

The image display apparatus 100 according to an embodiment may convert the planar 360-degree image 50 to a sphere-shaped 360-degree image 70 by performing graphic processing on the planar 360-degree image 50. The image display apparatus 100 may select an area 80 corresponding to a predetermined viewing angle from the sphere-shaped 360-degree image 70 and display an image corresponding to the selected area 80 on a display. Here, the image display apparatus 100 may scale the image corresponding to the selected area 80 according to a resolution of the display and display the same. Also, the image display apparatus 100 according to an embodiment may display a three-dimensional indicator 20 indicating a location of the area 80 in the 360-degree image. The viewing angle of the 360-degree image will be described in greater detail below with reference to FIG. 2.

Meanwhile, the image display apparatus 100 according to an embodiment may, for example, and without limitation, be a television (TV), but it is only an example. The image display apparatus 100 may be implemented as an electronic device including a display. For example, the image display apparatus 100 may be implemented as various electronic devices, such as, for example, and without limitation, a cellular phone, a tablet personal computer (PC), a digital camera, a camcorder, a laptop computer, a desktop computer, an electronic book terminal, a digital broadcasting terminal, a personal digital assistant (PDA), a portable multimedia player (PMP), a navigation device, an MPEG audio layer-3 (MP3) player, a wearable device, or the like. In particular, example embodiments may be easily implemented for a display apparatus having a large display, such as a TV. However, they are not limited thereto. Also, the image display apparatus 100 may be a stationary or a mobile apparatus, and may be a digital broadcasting receiver configured to receive digital broadcasting.

The image display apparatus 100 may be implemented not only as a flat display apparatus, but also as a curved display apparatus having a curved screen or a flexible display apparatus capable of adjusting a curvature thereof. Output resolutions of the image display apparatus 100 may include, for example, and without limitation, high definition (HD), full HD, ultra HD, or a resolution providing a greater vividness than ultra HD.

Also, the image display apparatus 100 according to an example embodiment may be a projector projecting an image on a screen, such as a wall, or the like, using light.

The image display apparatus 100 may be controlled by the controller 30. The controller 30 may be implemented as various types of devices for controlling the image display apparatus 100, such as, for example, and without limitation, a remote controller or a cellular phone.

Also, the controller 30 may control the image display apparatus 100 via short-range wireless communication, such as, for example, and without limitation, infrared communication or Bluetooth communication. The controller 30 may control functions of the image display apparatus 100 using at least one of a key (including a button), a touch pad, a microphone (not shown) capable of receiving a voice of a user, and a sensor (not shown) capable of recognizing motion of the controller 30, which are included in the controller 30.

The controller 30 according to an embodiment may include a four-directional key (or a four-directional button). The four-directional key may be used to shift a location of the area 80 of the 360-degree image, which is displayed on the display.

Also, the controller 30 may be a pointing device. For example, when the controller 30 receives an input of a predetermined key, the controller 30 may operate as a pointing device. When the controller 30 operates as the pointing device, the image display apparatus 100 may be controlled based on an input, e.g., a user's input, of moving the controller 30 in left, right, up, and down directions or inclining the controller 30 in a predetermined direction. Information about the motion of the controller 30 that is sensed via a sensor of the controller 30 may be transmitted to the image display apparatus 100. Based on the information about the motion of the controller 30, the image display apparatus 100 may move the area 80 displayed on the display in the 360-degree image.

Also, when the controller 30 includes a touch pad, the image display apparatus 100 may move the area 80 displayed on the display in the 360-degree image, based on a displacement value of a subject such as a finger of the user that is moving on the touch pad.

Figure 2:
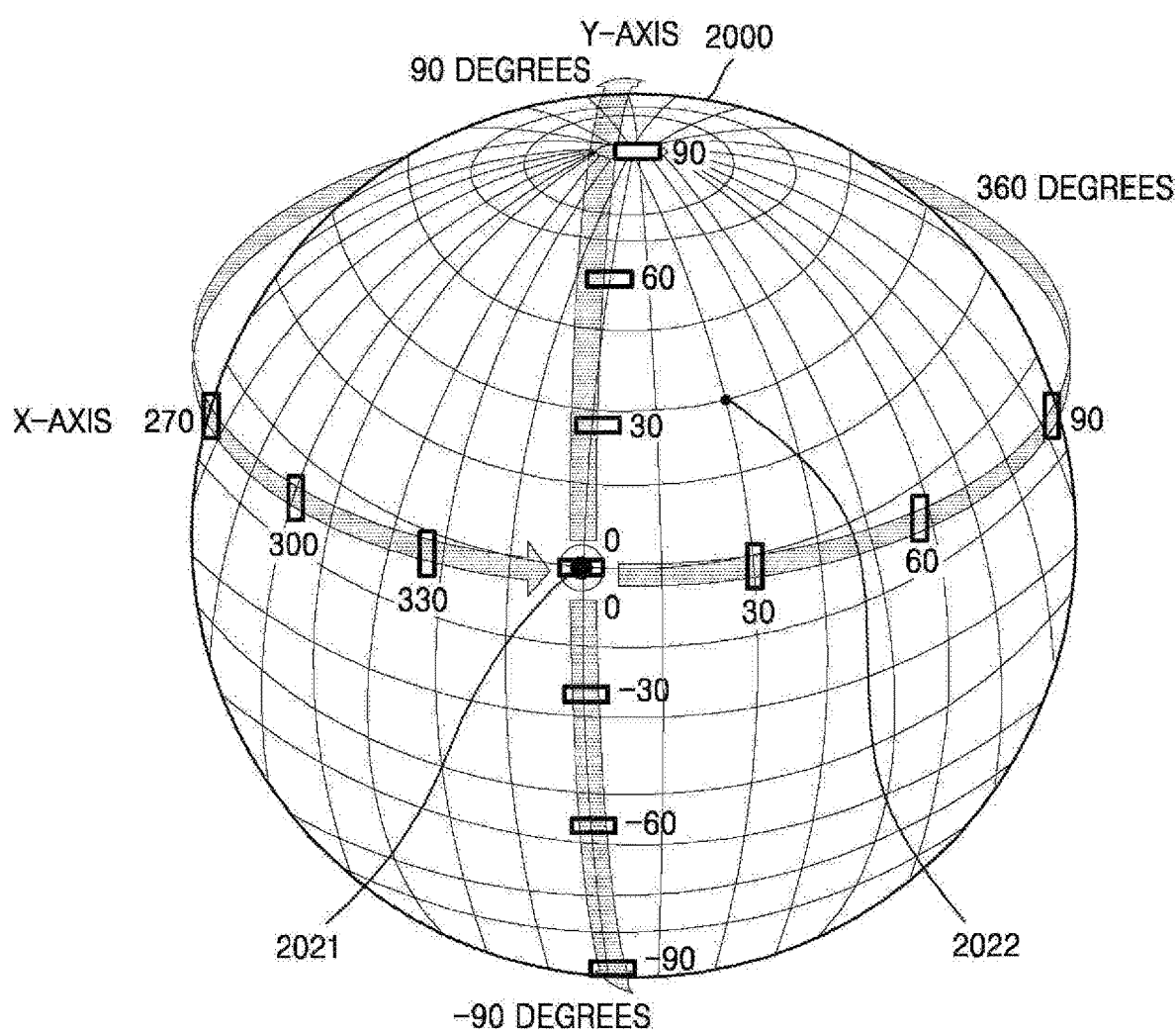
FIG. 2 is a diagram illustrating example viewing angles of a 360-degree image.

FIG. 2 is a diagram illustrating an example of viewing angle of a 360-degree image.

As described above, the 360-degree image may be an image generated based on a plurality of images photographed in a 360-degree direction using at least one camera. Here, the photographed plurality of images may be mapped to a sphere, and contacts of the mapped images may be stitched to generate a sphere-shaped 360-degree image.

Also, the 360-degree image may denote an image having a viewing angle that is 360 degrees. When the 360-degree image is represented as a sphere-shaped image 2000, the viewing angle of the 360-degree image may include x-axis coordinates and y-axis coordinates. The x-axis coordinates may indicate angles formed when a vertical plane crossing the center of a sphere rotates along the surface of the sphere. The y-axis coordinates may indicate angles formed when a horizontal plane crossing the center of the sphere rotates along the surface of the sphere. For example, the x-axis coordinates may have a range of 0 degrees to 360 degrees. For example, the y-axis coordinates may have a range of −90 degrees to 90 degrees or 0 degrees to 180 degrees.

For example, referring to FIG. 2, when the viewing angle (x degrees, y degrees) from a reference point in the sphere-shaped image 2000 towards a point 2021 on the spherical surface of the sphere-shaped image 2000 is (0 degrees, 0 degrees), the viewing angle from the reference point towards a point 2022 is (30 degrees, 30 degrees).

Figure 3:
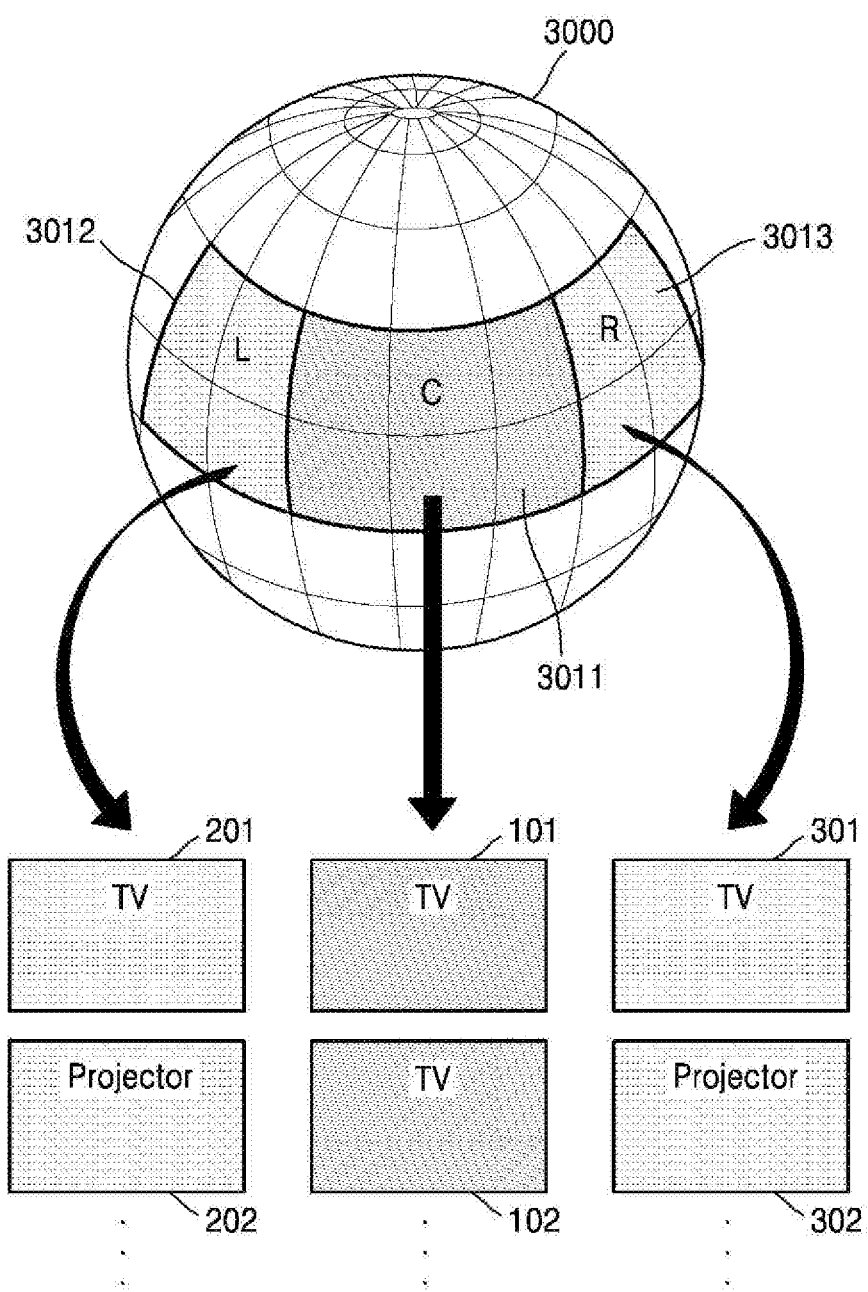
FIG. 3 is a diagram illustrating an example method of displaying a 360-degree image on a plurality of image display apparatuses, according to an example embodiment.

FIG. 3 is a diagram illustrating an example method of displaying a 360-degree image 3000 on a plurality of image display apparatuses 101, 201, and 301, according to an embodiment.

According to an embodiment, the 360-degree image 3000 may be divided and displayed on a plurality of displays so that a user may watch the 360-degree image 3000 having areas of various angles through a wide screen.

Referring to FIG. 3, the plurality of image display apparatuses 101, 201, and 301 may respectively display images 3011, 3012, and 3013 corresponding to different areas of the sphere-shaped 360-degree image 3000. According to an embodiment, the images 3011, 3012, and 3013 may be images representative of adjacent areas (e.g., images captured of adjacent areas and at different viewing angles). In the example illustrated in FIG. 3, the images 3011, 3012, and 3013 correspond to first through third areas (e.g., L, C, R) of the sphere-shaped 360-degree image 3000. Additionally, images 3011, 3012, and 3013 may be images respectively included in the first through third areas (e.g., L, C, R) of the sphere-shaped 360-degree image 3000.

For example, the first image display apparatus 101 may display on a display the image 3011 corresponding to the first area located at a front surface of the sphere-shaped 360-degree image 3000. The second image display apparatus 201 may display, on a display, the image 3012. The third image display apparatus 301 may display, on a display, the image 3013. Image 3012 corresponds to the second area (e.g., L) adjacent to the left side of the first area (e.g., C), and image 3013 corresponds to the third area (e.g., R) adjacent to the right side of the first area.

According to an embodiment, the first through third image display apparatuses 101, 201, and 301 may be implemented as TVs. Alternatively, the first image display apparatus 101 may be TV, and the second image display apparatus 201 and the third image display apparatus 301 may be a projector. However, embodiments are not limited thereto. The 360-degree image 3000 according to an embodiment may be displayed by image display apparatuses having various combinations.

According to an embodiment, the first image display apparatus 101 may pre-set the second and third image display apparatuses 201 and 301 as devices to share an image. According to an embodiment, the first through third image display apparatuses 101, 201, and 301 may be image display apparatuses installed in a household via the same Wifi network.

Also, each of the first through third image display apparatuses 101, 201, and 301 according to an embodiment may include a processor and operate based on control of the processor. Also, the first through third image display apparatuses 101, 201, and 301 may be a plurality of image display apparatuses operating based on control of a common processor.

FIG. 3 illustrates an example in which there are three image display apparatuses 101, 201, and 301, according to an embodiment. However, the present disclosure is not limited thereto. The 360-degree image 3000 according to an embodiment may be displayed by two or more image display apparatuses.

Also, a viewing angle, a size, an aspect ratio, a magnification of enlarged or compact displaying of image, etc. of each area of the 360-degree image, which is displayed on each of the image display apparatuses 101, 201, and 301, may be set as defaults or may be set or revised based on an input, e.g., a user's input, and may vary according to various embodiments.

According to an embodiment, the plurality of image display apparatuses 101, 201, and 301 located adjacent to one another may respectively display images corresponding to adjacent areas of the 360-degree image 3000, thereby having a visual effect that the 360-degree image 3000 is divided and displayed on an enlarged screen in a seamless manner. Accordingly, the user may have a visual effect of watching the 360-degree image 3000 having a wide range on a wide screen, due to the plurality of image display apparatuses 101, 201, and 301.

Figure 4:
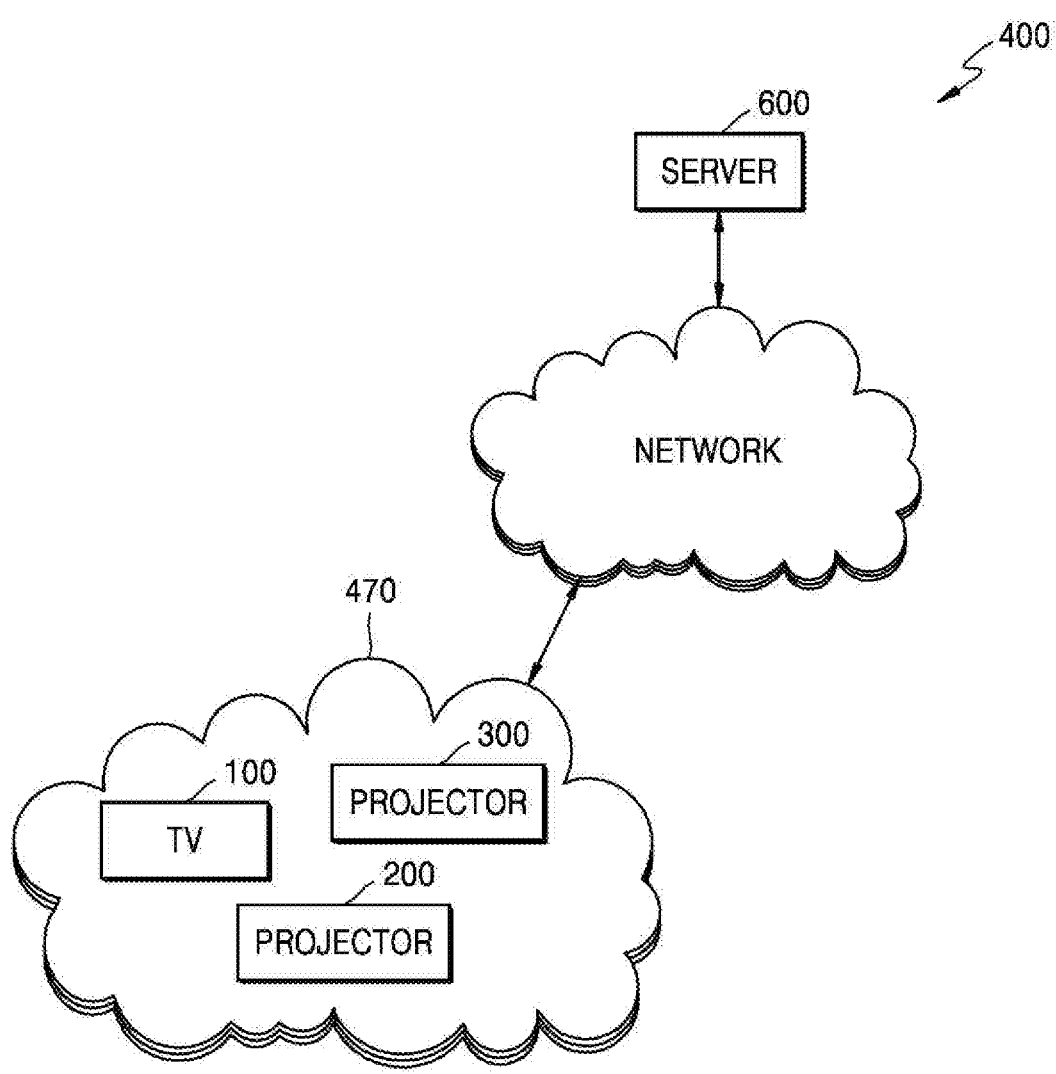
FIG. 4 is a diagram illustrating an example system including a server and at least one image display apparatus to display a 360-degree image on a plurality of displays, according to an example embodiment.

FIG. 4 is a diagram illustrating an example system 400 including a server 600 and more than one image display apparatuses 100, 200, and 300, for displaying a 360-degree image on a plurality of displays, according to an example embodiment.

Referring to FIG. 4, the system 400 may include, for example, the server 600, a terminal group 470 including the plurality of image display apparatuses 100, 200, and 300, and a network. The server 600 and each of the image display apparatuses 100, 200, and 300, and the server 600 and the terminal group 470 may be connected to one another via the network.

The terminal group 470 including the image display apparatuses 100, 200, and 300 may include display devices and/or computing devices which include a processor and a display to display, in a software or a hardware manner, a 360-degree image.

For example, the terminal group 470 may include image, for example, and without limitation, display apparatuses, such as the TV 100, and the projectors 200 and 300, which may be included in the same Wifi network zone and which are capable of communicating with one another.

According to an embodiment, the image display apparatuses 100, 200, and 300 may receive the 360-degree image from the server 600. Also, the image display apparatuses 100, 200, and 300 may provide the 360-degree image to the server 600.

According to an embodiment, the first image display apparatus 100 may generate area extraction information.

The area extraction information according to an example embodiment may include at least one of: location information, size information, display magnification information, reproduction point information of a first area of the 360-degree image, the first area corresponding to a displayed first image, and information regarding an adjacent area of the displayed first area.

According to an embodiment, the first image display apparatus 100 may provide the 360-degree image and the area extraction information to the second image display apparatus 200.

The second image display apparatus 200 according to an example embodiment may determine a second area of the 360-degree image, the second area being adjacent to the first area, based on the area extraction information generated by the first image display apparatus 100. The second image display apparatus 200 may convert the planar 360-degree image into a sphere-shaped 360-degree image and extract a second image corresponding to the second area. According to an embodiment, the second image display apparatus 200 may display the extracted second image on a display.

Alternatively, according to an embodiment, the first image display apparatus 100 may provide the 360-degree image and the area extraction information to the server 600. According to an example embodiment, the server 600 may determine the second area adjacent to the first area, based on the area extraction information. The server 600 may convert the planar 360-degree image into the sphere-shaped 360-degree image and extract the second image corresponding to the second area. According to an embodiment, the server 600 may transmit the extracted second image to the second image display apparatus 200. According to an embodiment, the second image display apparatus 200 may display the second image on the display.

Figure 5:
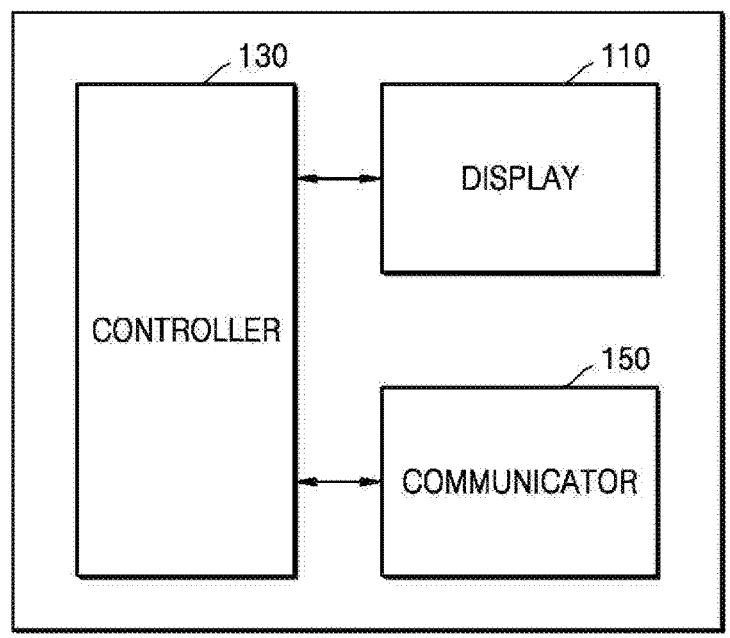
FIG. 5 is a block diagram illustrating an example structure of an image display apparatus displaying a 360-degree image, according to an example embodiment.

FIG. 5 is a block diagram illustrating an example structure of an image display apparatus 100a for displaying a 360-degree image, according to an example embodiment. The image display apparatus 100a illustrated in FIG. 5 may be an embodiment of the image display apparatus 100 illustrated in FIG. 1.

Referring to FIG. 5, the image display apparatus 100a according to an embodiment may include a display 110, a controller (e.g., including processing circuitry) 130, and a communicator (e.g., including communication circuitry) 150.

The display 110 may generate a driving signal by converting an image signal, a data signal, an on-screen-display (OSD) signal, a control signal, etc. processed by the controller 130. The display 110 may be implemented as a plasma display panel (PDP), a liquid crystal display (LCD), an organic light-emitting display, a flexible display, or the like, but is not limited thereto. Also, the display 110 may be implemented as a three-dimensional (3D) display. Also, the display 110 may be formed as a touch screen to be used not only as an output device, but also as an input device.

The display 110 according to an embodiment may display a 360-degree image. The display 110 may display an image corresponding to an area of the 360-degree, the area corresponding to a predetermined viewing angle. Also, the display 110 may display an image corresponding to a changed display area, in response to an input, e.g., a user's input, of changing the displayed area of the 360-degree image.

The controller 130 may include various processing circuitry and process the image signal and input the processed image signal to the display 110. Accordingly, an image corresponding to the input image signal may be displayed on the display 110. Also, the controller 130 may also control the image display apparatus 100a based on a received command, e.g., user's command that is sensed via a sensor 160 (see, e.g., FIG. 7), or via a program included in the controller 130.

For example, according to an embodiment, the controller 130 may move a location of the area of the 360-degree image, the area being displayed on the display 110, in response to a user's input that is sensed, and may control the display 110 to display an image corresponding to the moved area.

Also, the controller 130 may increase or decrease a display magnification of the area of the 360-degree image, which is displayed on the display 110, in response to a sensed zoom-in or zoom-out input.

Also, according to an embodiment, the controller 130 may control the image display apparatus 100a to display a first image corresponding to a first area of the 360-degree image on the display 110 and to display a second image corresponding to a second area of the 360-degree image, the second area being adjacent to the first area, on the second image display apparatus 200.

According to an embodiment, the controller 130 may transmit the 360-degree image and the area extraction information to the second image display apparatus 200 or the server 600.

The communicator 150 may include various communication circuitry and enable the image display apparatus 100a to communicate with other electronic devices. The communicator 150 may transmit the area extraction information to the outside via a network, wherein the area extraction information includes at least one of: location information, size information, display magnification information, reproduction point information of the area of the 360-degree image, the area being displayed on the display 110, and information regarding an adjacent area of the displayed area.

Figure 6:
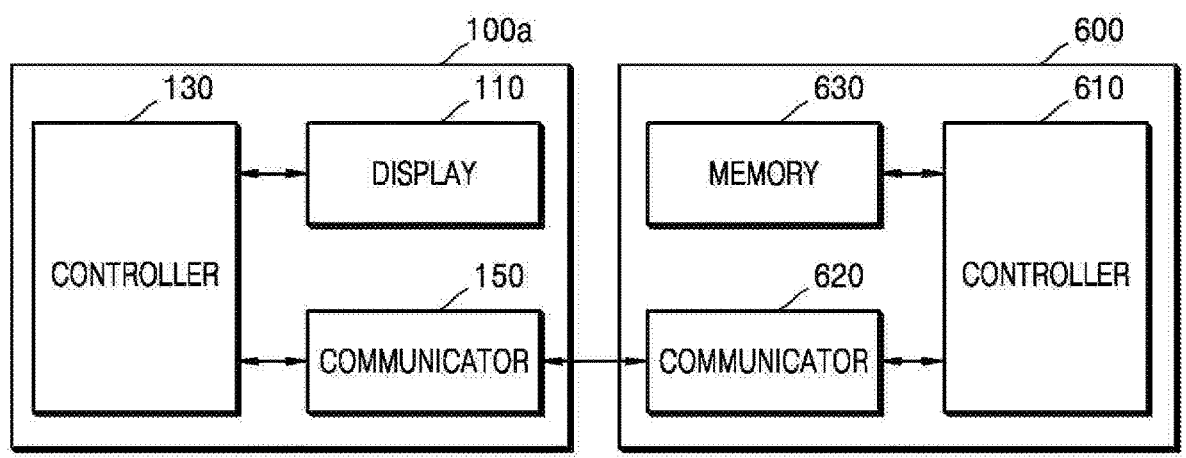
FIG. 6 are block diagrams illustrating an example structure of an image display apparatus displaying a 360-degree image and an example structure of a server, according to an example embodiment.

FIG. 6 is a block diagram illustrating an example image display apparatus 100b displaying the 360-degree image and the server 600, according to an example embodiment. The image display apparatus 100a illustrated in FIG. 6 may be an embodiment of the image display apparatus 100 illustrated in FIG. 1.

Referring to FIG. 6, the image display apparatus 100b according to an embodiment may include the display 110, the controller (e.g., including processing circuitry) 130, and the communicator (e.g., including communication circuitry) 150. Descriptions of the display 110 and the controller 130 are similar to or the same as the descriptions thereof with reference to FIG. 5, and thus, will not be repeated.

Referring to FIG. 6, the server 600 according to an embodiment may include a controller (e.g., including processing circuitry) 610, a communicator (e.g., including communication circuitry) 620, and a memory 630.

The communicator 150 of the image display apparatus 100b may include various communication circuitry and perform communication with the communicator 620 of the server 600. The communicator 150 of the image display apparatus 100b according to an embodiment may request a 360-degree image from the server 600 based on control of the controller 130. The communicator 150 of the image display apparatus 100b according to an embodiment may receive the 360-degree image from the server 600.

Also, according to an embodiment, the controller 130 of the image display apparatus 100b may include various processing circuitry and extract area extraction information from a file of a 360-degree image received from another image display apparatus or the server 600, or obtain the area extraction information from a metafile, which is separate from the file of the 360-degree image.

According to an embodiment, the communicator 620 of the server 600 may include various communication circuitry and transmit the 360-degree image in response to the request of the image display apparatus 100b, based on control of the controller 610.

According to an embodiment, the 360-degree image may be stored to the memory 630 of the server 600.

Also, according to an embodiment, the communicator 620 of the server 600 may receive the 360-degree image from the image display apparatus 100b, under the control of the controller 610. The communicator 620 of the server 600 may receive the area extraction information corresponding to the 360-degree image, along with the 360-degree image or separately from the 360-degree image.

According to an embodiment, the controller 610 of the server 600 may include various processing circuitry and control general components of the server 600, including the communicator 620 and the memory 630.

The controller 610 according to an embodiment may manage the area extraction information corresponding to the 360-degree image.

The controller 610 of the server 600 may extract the area extraction information from the file of the 360-degree image or obtain the area extraction information from the metafile, which is separate from the file of the 360-degree image.

According to an embodiment, the controller 610 may manage the area extraction information corresponding to each of a plurality of 360-degree images.

According to an embodiment, a plurality of pieces of area extraction information may be generated and managed with respect to one 360-degree image. The plurality of pieces of area extraction information may respectively correspond to the plurality of image display apparatuses 200 and 300, which are to share an image.

Figure 7:
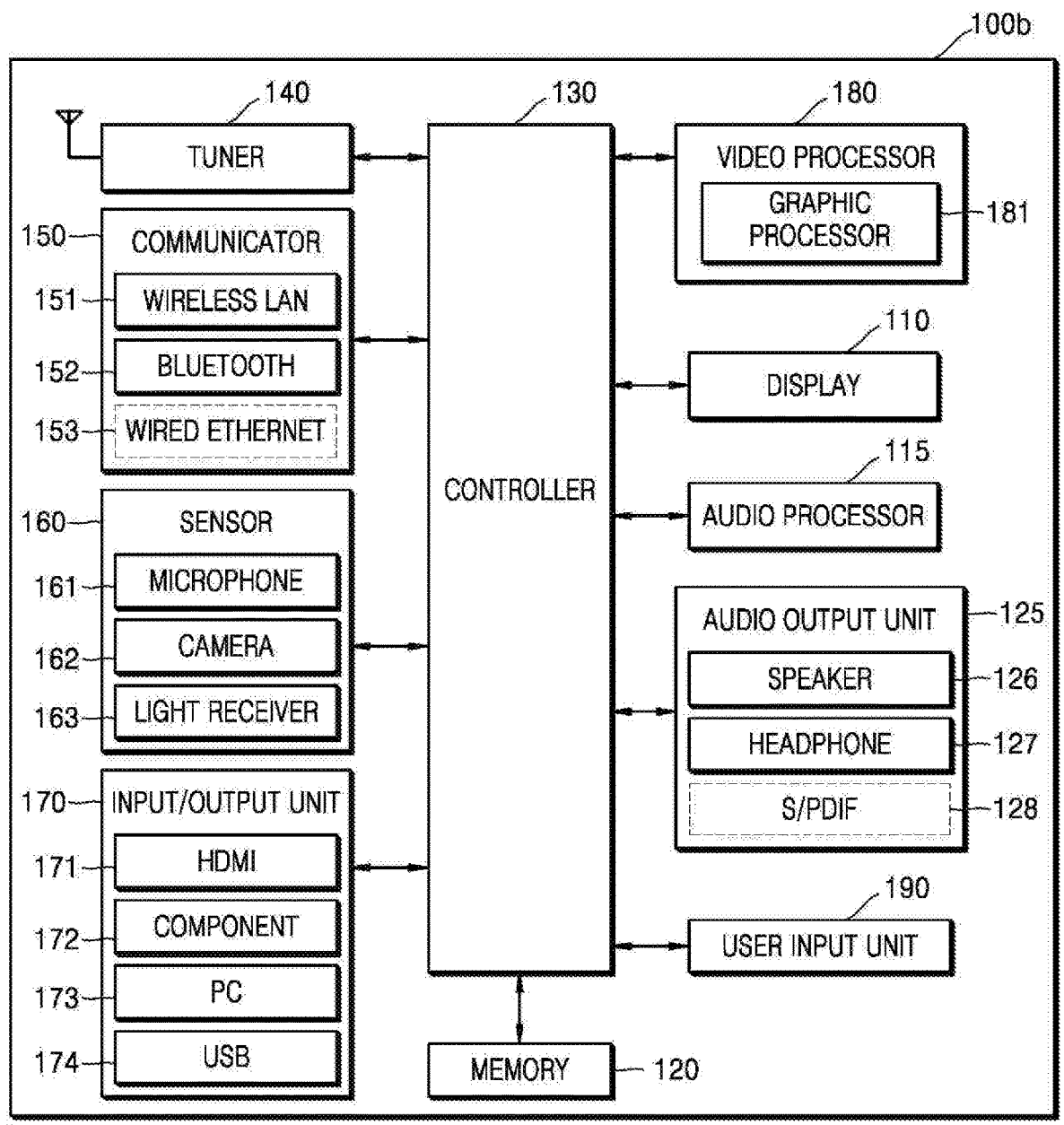
FIG. 7 is a block diagram illustrating an example structure of an image display apparatus displaying a 360-degree image, according to an example embodiment.

FIG. 7 is a block diagram illustrating an example structure of the image display apparatus 100b displaying a 360-degree image, according to an example embodiment. The image display apparatus 100b illustrated in FIG. 7 may be an embodiment of the image display apparatus 100 of FIG. 1.

Referring to FIG. 7, the image display apparatus 100b according to an embodiment may further include a memory 120, a tuner 140, the sensor 160, an input/output unit (e.g., including input/output circuitry) 170, a video processor (e.g., including video processing circuitry) 180, a graphic processor (e.g., including graphic processing circuitry) 181, an audio processor (e.g., including audio processing circuitry) 115, an audio output unit (e.g., including audio output circuitry) 125, and a user input unit (e.g., including input circuitry) 190, in addition to the controller (e.g., including processing circuitry) 130, the display 110, and the communicator (e.g., including communication circuitry) 150.

Aspects of the controller 130, the display 110, and the communicator 150, which are the same as or similar the aspects described with reference to FIGS. 5 and 6, will not be repeated with reference to FIG. 7.

The display 110 may display on a screen a video included in a broadcasting signal received via the tuner 140 based on control of the controller 130. Also, the display 110 may display content (for example, a video) input via the communicator 150 or the input/output unit 170. The display 110 may output an image stored to the memory 120 based on control of the controller 130. Also, the display 110 may display a sound user interface (UI) (for example, including a guide of sound instructions) for performing a sound recognition task based on sound recognition, or a motion UI (for example, including a guide of user motion for motion recognition) for performing a motion recognition task based on motion recognition.

The memory 120 may store various data, programs, or applications for driving and controlling the image display apparatus 100b based on control of the controller 130. The memory 120 may store signals or data that is input/output in correspondence to the operations of the video processor 180, the display 110, the audio processor 115, the audio output unit 125, the controller 130, the tuner 140, the communicator 150, the sensor 160, and the input/output unit 170. The memory 120 may store a control program for controlling the image display apparatus 100b and the controller 130, an application initially provided from a manufacturer or downloaded from the outside, a graphical user interface (GUI) related to the application, an object (for example, image, text, icons, buttons, etc.) for providing the GUI, user information, documents, databases, or related data.

According to an embodiment, the memory 120 may store the 360-degree image.

According to an embodiment, the memory 120 may include one or more applications, which include at least one instruction for generating area extraction information related to a displayed image, at least one instruction for storing the generated area extraction information, at least one instruction for reading the stored area extraction information, at least one instruction for editing the read area extraction information, and at least one instruction for playing the 360-degree image by using the area extraction information received from another image display apparatus or a server.

According to an embodiment, the term "memory" may include, for example, and without limitation, read-only memory (ROM) or random-access memory (RAM) of the controller 130, or a memory card (for example, a micro SD card (not shown) or a universal serial bus (USB) memory (not shown)) mounted in the image display apparatus 100b.

Also, the memory 120 may include a nonvolatile memory, a volatile memory, a hard disk drive (HDD), or a solid state drive (SSD).

The controller 130 may include various processing circuitry and control general operations of the image display apparatus 100b and signal flows among the components included in the image display apparatus 100b, and may process data. When there is a user's input or when a stored predetermined condition is satisfied, the controller 130 may execute an operating system (OS) and various applications stored in the memory 120.

The controller 130 may include, for example, and without limitation, RAM configured to store a signal or data which is input from the outside of the image display apparatus 100b or used as a storage area corresponding to various operations performed in the image display apparatus 100b, ROM in which a control program for controlling the image display apparatus 100b is stored, and a processor.

The controller 130 according to an embodiment may execute the at least one instruction stored to the memory 120 to generate, while a 360-degree image is reproduced, area extraction information including at least one of location information, size information, display magnification information, reproduction point information of an area of the 360-degree image, the area corresponding to a currently displayed image, and information regarding an adjacent area of the area.

The controller 130 according to an embodiment may execute the at least one instruction stored to the memory 120 to reproduce the 360-degree image using the area extraction information stored to the memory 120 or the area extraction information received from another image display apparatus or the server 600.

The video processor 180 may include various video processing circuitry and a graphic processing unit (GPU) 181 for processing the graphics corresponding to a video. The video processor 180 may be implemented as a system on chip (SoC) in which a core processor (not shown) and the GPU are integrated. The video processor 180 may include a single core processor, a dual core processor, a triple core processor, a quadruple core processor, and a multiple core processor.

Also, the video processor 180 may include a plurality of processors. For example, the video processor 180 may be implemented to include a main processor (not shown), and a sub-processor (not shown) operating in a sleep mode.

The tuner 140 may include various circuitry to tune and select only a frequency of a channel that is to be received by the image display apparatus 100b, from among many radio wave components, based on amplification, mixing, resonance, etc. of a broadcasting signal received wirelessly or in wire. The broadcasting signal may include an audio, a video, and additional information (for example, a electronic program guide (EPG)).

The tuner 140 may receive the broadcasting signal at a frequency bandwidth corresponding to a channel number (for example, cable broadcasting number 506), based on a user's input (for example, a control signal received from the controller 130, that is, an input of a channel number, an input of channel up-down, or an input of a channel on an EPG screen).

The tuner 140 may receive the broadcasting signal from various sources, such as ground-wave broadcasting, cable broadcasting, satellite broadcasting, internet broadcasting, etc. The tuner 140 may receive the broadcasting signal from a source, such as analog broadcasting or digital broadcasting. The broadcasting signal received via the tuner 140 may be decoded (for example, audio decoding, video decoding, or additional information decoding) and separated into an audio, a video, and/or additional information. The separated audio, video, and/or additional information may be stored in the memory 120 based on control of the controller 130.

The image display apparatus 100b may include one tuner 140 or a plurality of tuners. The tuner 140 may be implemented as all-in-one by being included in the image display apparatus 100b, or the tuner 140 may be implemented as a separate device (for example, a set-top box (not shown)) from the display apparatus 100b, which is electrically connected to the image display apparatus 100b. Alternatively, the tuner 140 may be implemented to be connected to the input/output unit 170.

The communicator 150 may include various communication circuitry and connect the image display apparatus 100b to an external device (for example, an audio device, etc.) under control of the controller 130. The controller 130 may transmit/receive content to the external device connected to the image display apparatus 100b via the communicator 150, download an application from the external device, or perform web-browsing. The communicator 150 may include various communication circuitry, such as, for example, and without limitation, one or more of wireless local area network (LAN) 151, Bluetooth 152, and wired Ethernet 153 in correspondence to the performance and the structure of the image display apparatus 100b. Also, the communicator 150 may include a combination of the wireless LAN 151, the Bluetooth 152, and the wired Ethernet 153. The communicator 150 may receive a control signal of the controller 130 based on control of the controller 130. The control signal may be implemented as a Bluetooth type, a radio frequency (RF) signal type, or a Wifi type.

The communicator 150 may further include various short-range wireless communication circuitry (for example, near-field communication (NFC) (not shown)) other than the Bluetooth communication.

According to an embodiment, the communicator 150 may request the 360-degree image from a server, and receive the 360-degree image from the server.

The sensor 160 may sense a voice, an image, or interaction of the user, and may include various sensors or sensing circuitry including, for example and without limitation, one or more of a microphone 161, a camera 162, and a light receiver 163.

The microphone 161 may receive an uttered voice of the user. The microphone 161 may convert the received voice into an electrical signal and output the electrical signal to the controller 130. The user's voice may include, for example, a voice corresponding to a menu or a function of the image display apparatus 100b. For example, a user's input may be received via the microphone 161.

The camera 162 may receive an image (for example, a consecutive frame) corresponding to motion of a user including gestures that is included within a camera recognition range. The controller 130 may select a menu displayed on the image display apparatus 100b based on received motion recognition, or may perform a control operation corresponding to the motion recognition. For example, the controller 130 may perform channel adjustment, volume adjustment, indicator movement, cursor movement, movement of an area of the 360-degree image, which is displayed on the display 110.

The light receiver 163 may receive a light signal (including a control signal) received from the controller 30 (e.g., remote controller) which is provided outside the image display apparatus 100b, via an optical window (not shown) of a bezel of the display 110. The light receiver 163 may receive from the external controller 30 the light signal corresponding to a user's input (for example, a touch operation, a press operation, a touch gesture, a voice, or a motion). A control signal may be extracted from the received light signal, based on control of the controller 130. For example, a user's input of controlling the reproduction of the 360-degree image may be received via the light receiver 163.

The input/output unit 170 may include various input/output circuitry and receive a video (for example, a moving picture, etc.), an audio (for example, a voice, music, etc.), additional information (for example, EPG, etc.), etc., from the outside of the image display apparatus 100b based on control of the controller 130. The input/output unit 170 may include various input/output circuitry, such as, for example, and without limitation, one or more of a high-definition multimedia interface (HDMI) port 171, a component jack 172, a PC port 173, and a USB port 174. The input/output unit 170 may include a combination of the HDMI port 171, the component jack 172, the PC port 173, and the USB port 174.

The video processor 180 may include various processing circuitry and perform processing on the video data that is received by the image display apparatus 100b. The video processor 180 may perform various image processing on the video data, such as decoding, scaling, noise filtering, frame rate conversion, resolution conversion, etc.

The graphic processor 181 may include various processing circuitry and generate a screen including various objects, such as icons, images, text, etc. using, for example, a calculator (not shown) and a renderer (not shown). The calculator may calculate a coordinate value on which each object is to be displayed based on a layout of a screen, and an attribute value of the object, such as a shape, a size, a color, etc., by using a user's input sensed via the sensor 160. The renderer may generate screens of various layouts including the object, based on the attribute value calculated by the calculator. The screen generated by the renderer may be displayed on a display area of the display 110. The graphic processor 181 according to an embodiment may map the planar 360-degree image as a sphere to generate the sphere-shaped 360-degree image, as described with reference to FIG. 1.

The audio processor 115 may include various processing circuitry and perform processing on the audio data. The audio processor 115 may perform various processing on the audio data, such as decoding, amplification, noise filtering, etc. The audio processor 115 may include a plurality of audio processing modules to process audios corresponding to a plurality of pieces of content.

The audio output unit 125 may include various components and circuitry and output an audio included in the broadcasting signal received via the tuner 140 based on control of the controller 130. The audio output unit 125 may output an audio (for example, a voice, sound, etc.) input via the communicator 150 or the input/output unit 170. Also, the audio output unit 125 may output an audio stored to the memory 120, based on control of the controller 130. The audio output unit 125 may include, for example, and without limitation, one or more of a speaker 126, a headphone output terminal 127, and a Sony/Philips digital interface (S/PDIF) 128. The audio output unit 125 may include a combination of the speaker 126, the headphone output terminal 127, and the S/PDIF output terminal 128.

The user input unit 190 may include various input circuitry, such as, for example, and without limitation, a keypad, a button, a touch pad, a touch screen, etc. A user may input a command with respect to the image display apparatus 100*b* to the controller 130 by manipulating the user input unit 190.

For example, the user input unit 190 may include a four-directional button or a four-directional key. The four-directional button or the four-directional key may be used to control a window, an area, an application, a pointer, or an item displayed on the display 110. The four-directional key or the four-directional button may be used to indicate left, right, up, and down movements. Also, it would be apparent to one of ordinary skill in the art that the user input unit 190 may include a two-directional key or a two-directional button, rather than the four-directional key or the four-directional button. Also, the user input unit 190 may include various types of input devices which may be manipulated by a user, such as a scroll key or a jog key.

Also, the user input unit 190 according to an embodiment may receive a user's input of dragging, touching, or flipping via a touch pad of the controller 130. Also, the image display apparatus 100*b* may be controlled based on the received user's input (for example, the direction of a drag input, duration of a touch input, etc.).

Meanwhile, the block diagrams of the image display apparatuses 100*a* and 100*b* illustrated in FIGS. 5 through 7 are described with respect to various example embodiments. The components of the block diagrams may be integrated, added, or omitted according to the specification of the actually implemented image display apparatus 100. That is, according to necessity, two or more components may be integrated into one component, or one component may be separated into two or more components. Also, the functions of the components of the block diagrams are described for the embodiments, and the detailed operations or devices do not limit the scope of the present disclosure.

Figure 8:
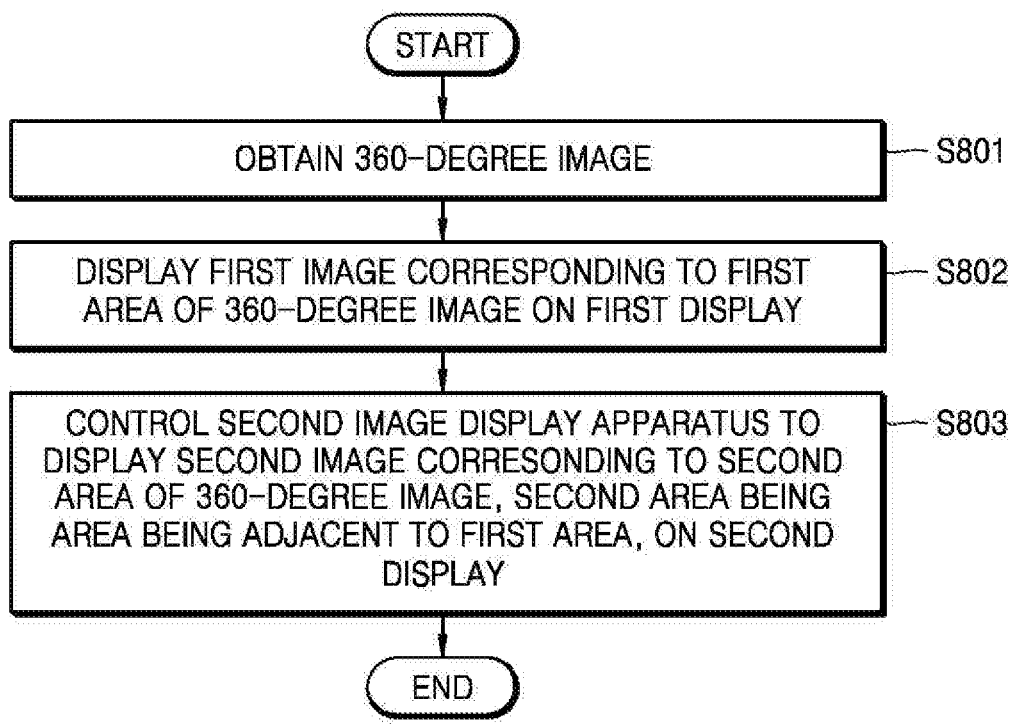
FIG. 8 is a flowchart illustrating an example method performed by an image display apparatus, according to an example embodiment.

FIG. 8 is a flowchart illustrating an example method performed by the image display apparatus 100, according to an example embodiment.

Referring to FIG. 8, in operation S801, the image display apparatus 100 may obtain a 360-degree image.

According to an embodiment, the image display apparatus 100 may obtain the 360-degree image from the server 600. For example, the image display apparatus 100 may request 360-degree image content from a web server and receive the 360-degree image content. Also, the image display apparatus 100 may receive a broadcasting stream of the 360-degree image, from a broadcasting server. As another example, the image display apparatus 100 may obtain the 360-degree image photographed by a camera connected to the image display apparatus 100. Also, the image display apparatus 100 may obtain the 360-degree image pre-stored in the memory 120.

In operation S802 of FIG. 8, the image display apparatus 100 may display a first image corresponding to a first area of the 360-degree image, on the first display 110.

According to an embodiment, the image display apparatus 100 may select the first area to be displayed on the first display 110, from among the 360-degree image, based on a pre-determined rule, or may determine the first area based on a user's input. For example, the image display apparatus 100 may select the first area of the 360-degree image, based on a viewing angle, a location, a size, a display magnification, etc., which are pre-determined. Also, the image display apparatus 100 may determine a location, a size, a display magnification (an enlargement or reduction magnification) of the first area, based on a user's input.

In operation S803 of FIG. 8, the image display apparatus 100 may control the second image display apparatus 200 to display a second image corresponding to a second area of the 360-degree image, wherein the second area is adjacent to the first area.

According to an example embodiment, the image display apparatus 100 may display the first area of the 360-degree image on the first display 110, and control the second image display apparatus 200 to display the second image corresponding to the second area adjacent to the first area displayed.

According to an example embodiment, the second image display apparatus 200 including a second display may be a display apparatus including a processor and an internal or an external display. As another example, the second image display apparatus 200 may be a display apparatus operating by the same processor as the image display apparatus 100.

According to an example embodiment, the image display apparatus 100 may transmit the 360-degree image to the second image display apparatus 200 including the second display. Alternatively, the image display apparatus 100 may transmit the 360-degree image to the server 600, and the server 600 may transmit the 360-degree image to the second image display apparatus 200.

When the image display apparatus 100 reproduces the 360-degree image, the image display apparatus 100 may generate area extraction information including at least one of location information, size information, display magnification information, reproduction point information of the first area corresponding to the first image that is displayed, and information regarding an adjacent area of the first area.

The image display apparatus 100 may transmit the area extraction information to the second image display apparatus 200 or the server 600, along with the 360-degree image or separately from the 360-degree image.

The second image display apparatus 200 or the server 600 may extract the second image from the 360-degree image, based on the area extraction information.

According to an example embodiment, based on the area extraction information, the second image display apparatus 200 or the server 600 may determine the second area which is adjacent to the first area displayed on the first image display apparatus 100, in a predetermined direction, and extract the second image corresponding to the second area.

According to an example embodiment, when the server 600 extracts the second image based on the area extraction information, the server 600 may transmit the second image to the second image display apparatus 200 to display the second image.

According to an example embodiment, since the 360-degree image may be displayed via a plurality of displays located adjacent to one another, a user may watch a wide 360-degree image in a seamless manner.

Figure 9:
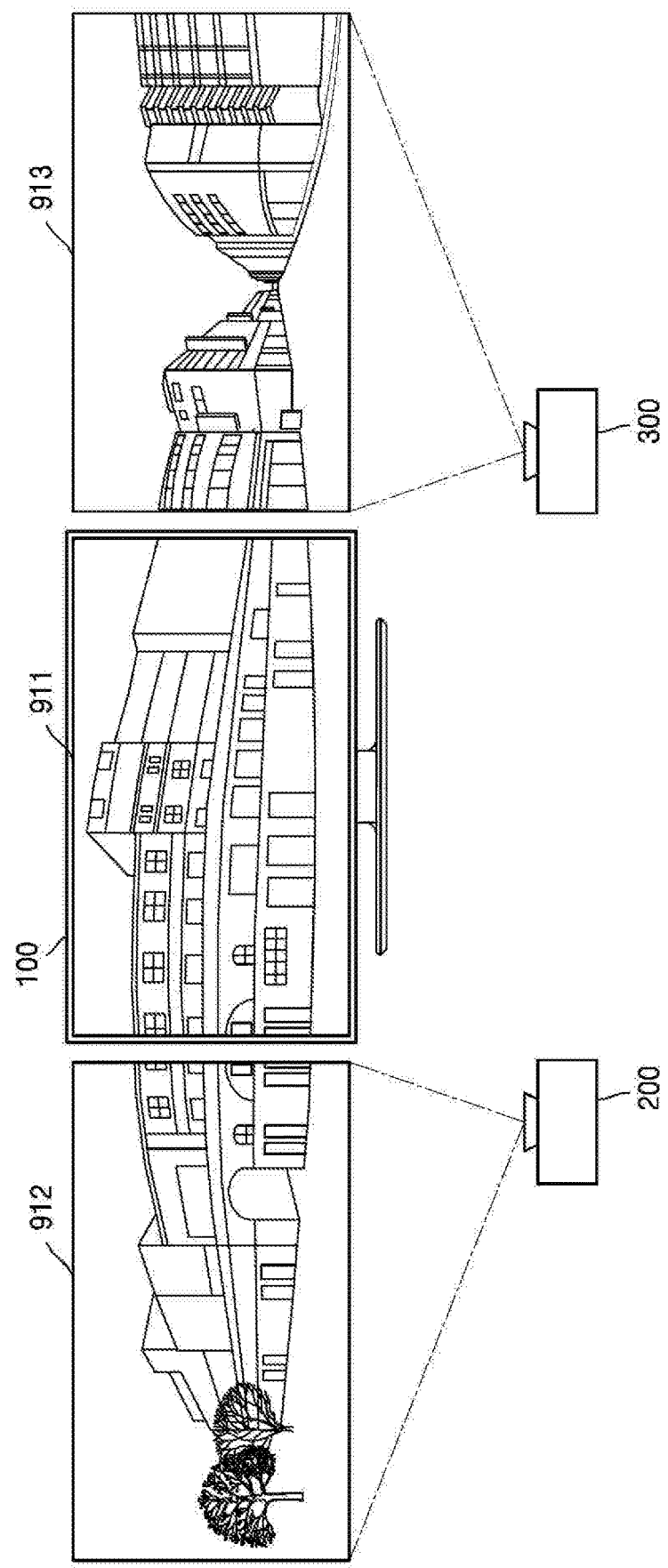
FIG. 9 is a diagram illustrating an example in which a plurality of image display apparatuses display a 360-degree image, according to an example embodiment.

FIG. 9 is a diagram illustrating an example in which the plurality of image display apparatuses 100, 200, and 300 display a 360-degree image according to an example embodiment.

According to an embodiment, the plurality of image display apparatuses 100, 200, and 300 may include the first image display apparatus (for example, a TV) 100 located in the center, and the second and third image display apparatuses (for example, projectors) 200 and 300 that are located on the left and right sides of the first image display apparatus 100, respectively.

According to an embodiment, the first image display apparatus 100 may pre-set the second and third image display apparatuses 200 and 300 as devices to share an image.

According to an embodiment, the first through third image display apparatuses 100, 200, and 300 may be image display apparatuses installed in the same WiFi network zone in a household.

The first image display apparatus 100 according to an embodiment may display a first image 911 corresponding to a first area of the 360-degree image. The second image display apparatus 200 located on the left side of the first image display apparatus 100 may display a second image 912 corresponding to a second area of the 360-degree image, the second area being adjacent to the left side of the first area. Also, the third image display apparatus 300 located on the right side of the first image display apparatus 100 may display a third image 913 corresponding to a third area of the 360-degree image, the third area being adjacent to the right side of the first area.

According to an example embodiment, a location of a screen on which the second image 912 which is projected when the second image display apparatus 200 is a projector is displayed, a location of a display of the first image display apparatus 100, and a location of a screen on which the third image 913 which is projected when the third image display apparatus 300 is a projector is displayed are adjacent to one another in a horizontal direction. Thus, a visual effect that the 360-degree image is displayed on one horizontally wide screen may be generated.

Figure 10:
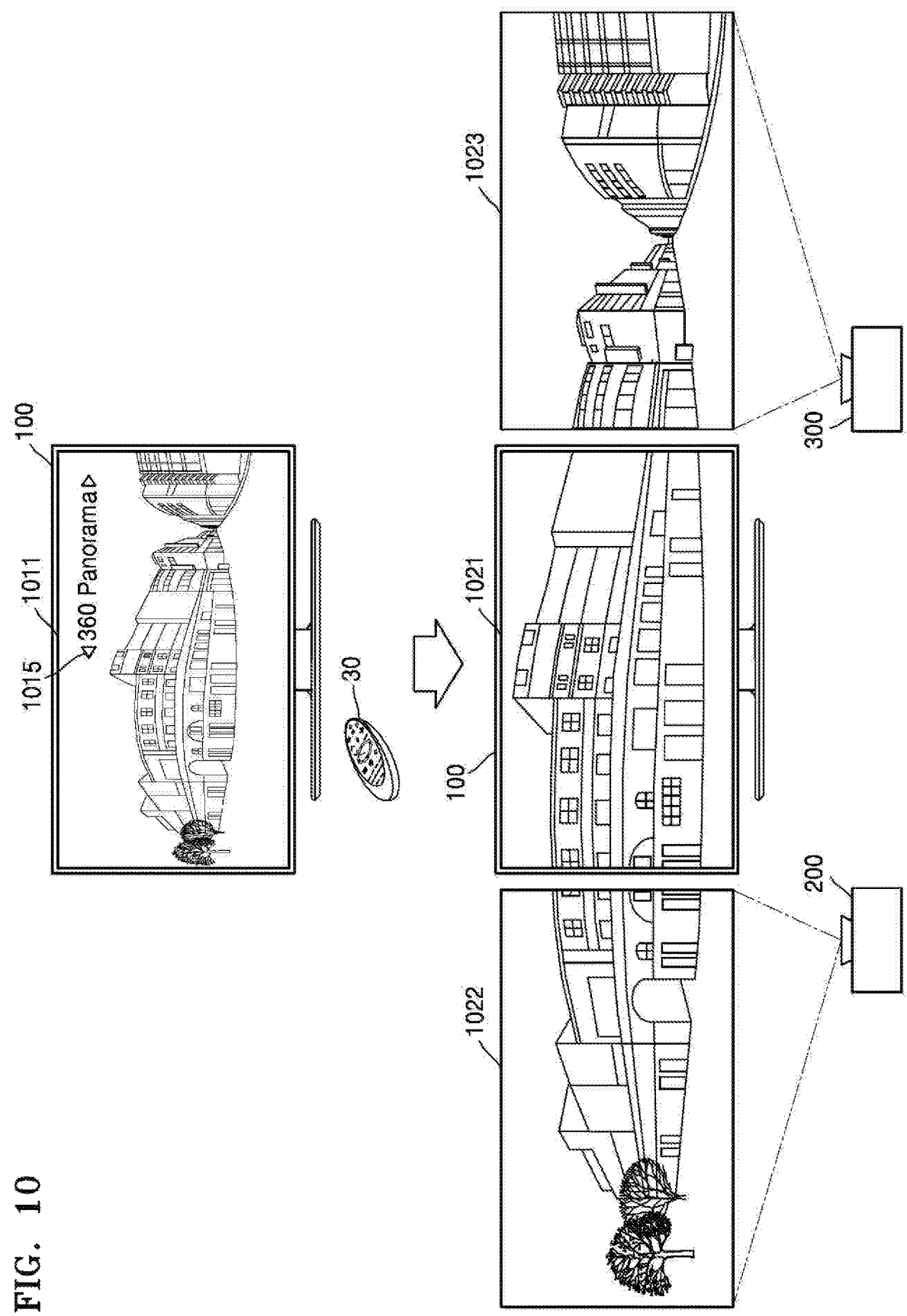
FIG. 10 is a diagram illustrating an example in which a 360-degree image displayed on one display is divided and displayed by a plurality of image display apparatuses, according to an example embodiment.

FIG. 10 is a diagram illustrating an example in which a 360-degree image 1011 displayed on one display is divided and displayed by the plurality of image display apparatuses 100, 200, and 300 according to an example embodiment.

According to an embodiment, the first image display apparatus 100 may display the 360-degree image 1011. When the first image display apparatus 100 receives a user's input of selecting an icon (for example, "360 panorama") 1015, the first image display apparatus 100 may display the 360-degree image 1011 displayed on the first image display apparatus 100 by dividing the 360-degree image 1011 into images 1021, 1022, and 1023, via the plurality of image display apparatuses 100, 200, and 300, based on control of the controller 130.

Referring to FIG. 10, the image 1021 corresponding to a central area of the 360-degree image 1011 may be displayed by the first image display apparatus 100, the image 1022 corresponding to a left area of the 360-degree image 1011 may be displayed by the second image display apparatus 200, and the image 1023 corresponding to a right area of the 360-degree image 1011 may be displayed by the third image display apparatus 300.

According to an embodiment, a location of a screen on which the image 1022 which is projected when the second image display apparatus 200 is a projector is displayed, a location of a display of the first image display apparatus 100, and a location of a screen on which the image 1023 which is projected when the third image display apparatus 300 is a projector is displayed are adjacent to one another in a horizontal direction. Thus, a visual effect that the 360-degree image 1011 is enlarged and displayed on a horizontally wide screen may be generated.

As another example, according to an embodiment, the first image display apparatus 100 may display a first image corresponding to a displayed first area of the 360-degree image, and may control the second image display apparatus 200 and the third image display apparatus 300 to respectively display second and third images corresponding to second and third areas adjacent to the first area.

For example, in response to a user's input, the first image display apparatus 100 may control the second image display apparatus 200 to display the second image corresponding to the second area of the 360-degree image, the second area being adjacent to the first area in a left side direction, and not being displayed.

Also, in response to a user's input, the first image display apparatus 100 may control the third image display apparatus 300 to display the third image corresponding to the third area of the 360-degree image, the third area being adjacent to the first area in a right side direction, and not being displayed.

According to an example embodiment, via a plurality of displays located adjacent to one another in a horizontal direction, the 360-degree image having a wider area than the 360-degree image displayed on one display may be displayed.

Figure 11:
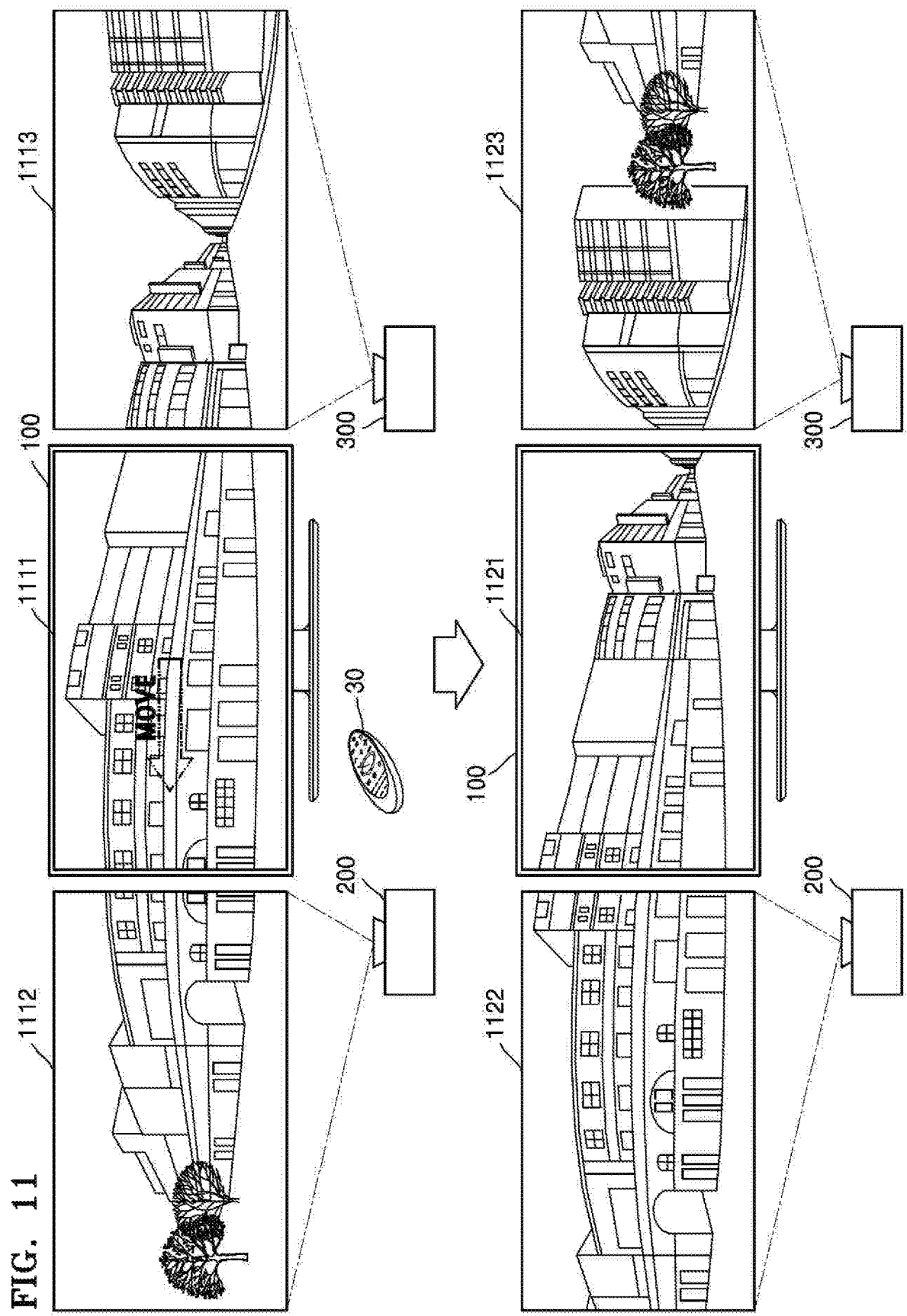
FIG. 11 is a diagram illustrating an example in which a display area of a 360-degree image is changed, according to an example embodiment.

FIG. 11 is a diagram illustrating an example in which a display area of a 360-degree image is changed, according to an example embodiment.

According to an embodiment, in response to a user's input of changing the displayed first area of the 360-degree image, the first image display apparatus 100 may change at least one of a location and a size of the first area, and display a first image corresponding to the changed first area on a first display. The first image display apparatus 100 may change the second area to be adjacent to the changed first area and may control the second image display apparatus 200 to display a second image corresponding to the changed second area on a second display.

Referring to FIG. 11, according to an example embodiment, the first through third image display apparatuses 100, 200, and 300 may respectively display images 1111, 1112, and 1113 respectively corresponding to adjacent areas of the 360-degree image.

For example, when the first image display apparatus 100 displays the first image 1111, the first image display apparatus 100 may receive a user's input of moving a location of the first image 1111, based on control of the controller 30. Here, the first image display apparatus 100 may display an image 1121 corresponding to an area moved, for example, in a left direction.

When the first image display apparatus 100 displays the image 1121 corresponding to the area moved in the left direction, the second image display apparatus 200 and the third image display apparatus 300 may respectively display images 1122 and 1123 respectively corresponding to areas adjacent to left and right sides of the changed first image, in synchronization to the changed location of the first image 1121.

According to an embodiment, when the displayed area of the first image display apparatus 100 is moved, the displayed areas of the second and third image display apparatuses 200 and 300 are also moved in the same direction. Thus, a visual effect that the areas of the 360-degree image, displayed on the first through third image display apparatuses 100, 200, and 300, are simultaneously moved in the same direction may be generated.

Figure 12:
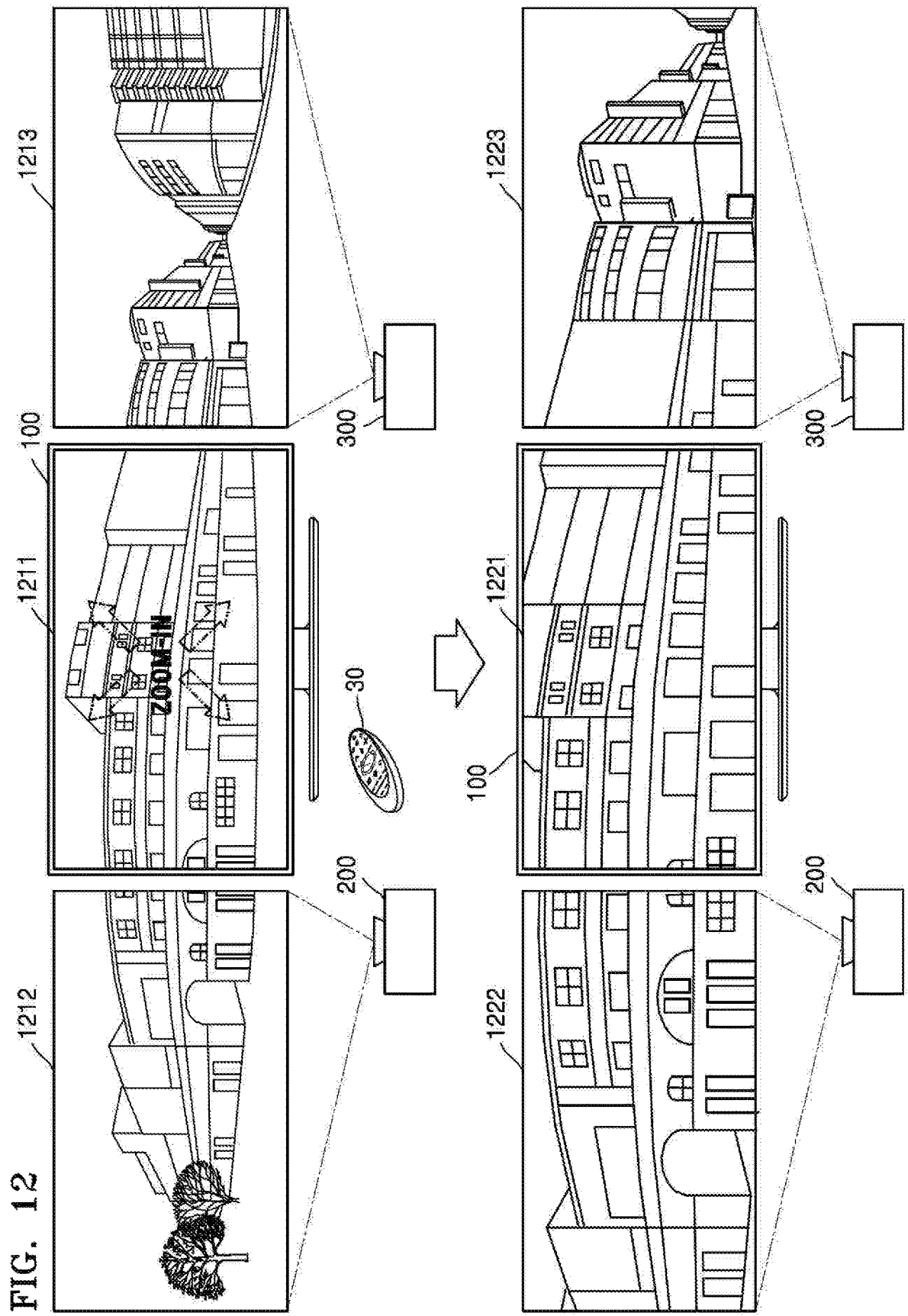
FIG. 12 is a diagram illustrating an example in which a display magnification of a 360-degree image is changed, according to an example embodiment.

FIG. 12 is a diagram illustrating an example in which a display magnification of a 360-degree image is changed, according to an example embodiment.

Referring to FIG. 12, according to an example embodiment, the first through third image display apparatuses 100, 200, and 300 may respectively display images 1211, 1212, and 1213 respectively corresponding to adjacent areas of the 360-degree image.

For example, when the first image display apparatus 100 displays the first image 1211, the first image display apparatus 100 may receive a user's input of enlarging a display magnification of the first image 1211, based on control of the controller 30. Here, the first image display apparatus 100 may display an image 1221 corresponding to an area enlarged based on the enlarged magnification.

When the first image display apparatus 100 displays the image 1221 corresponding to the area enlarged based on the enlarged magnification, the second image display apparatus 200 and the third image display apparatus 300 may respectively display images 1222 and 1223 respectively corresponding to areas adjacent to left and right sides of the changed first image 1221.

According to an example embodiment, the images 1211, 1212, and 1213 displayed on the first through third image display apparatuses 100, 200, and 300 and adjacent to one another may be enlarged or reduced. Thus, a visual effect as if one image is enlarged or reduced may be generated.

Figure 13:
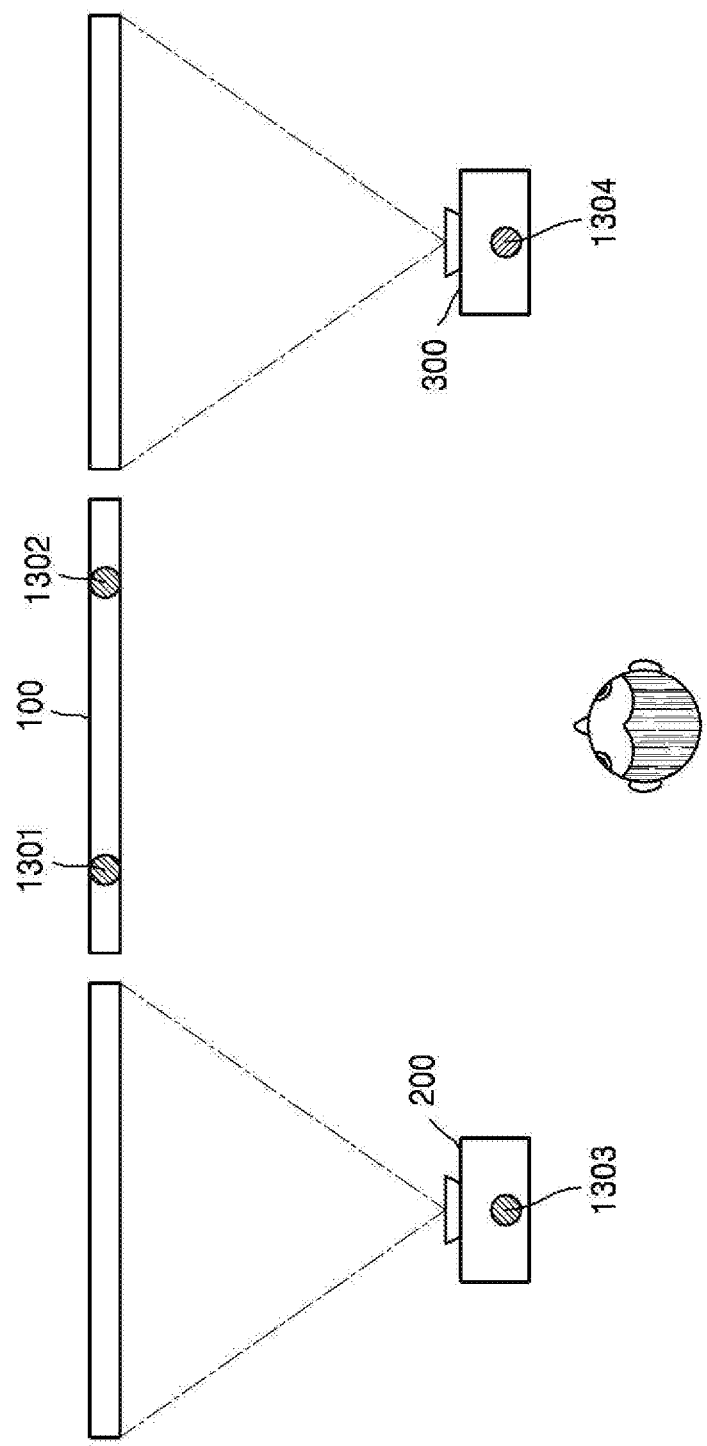
FIG. 13 is a diagram illustrating an example audio output based on a layout of a speaker included in a plurality of image display apparatuses, according to an example embodiment.

FIG. 13 is a diagram illustrating an example audio output based on a layout of speakers 1301, 1302, 1303, and 1304 included in the plurality of image display apparatuses 100, 200, and 300 according to an example embodiment.

Referring to FIG. 13, the first image display apparatus 100 according to an embodiment may include the plurality of speakers 1301 and 1302. The second image display apparatus 200 may include the speaker 1303, and the third image display apparatus 300 may include the speaker 1304. However, embodiments are not limited thereto.

The first image display apparatus 100 according to an example embodiment may reconstruct an audio signal that is to be output, based on speaker layout information including relative locations of the speakers 1301 and 1302 included in the first image display apparatus 100 and the speakers 1303 and 1304 respectively included in the second and third image display apparatuses 200 and 300, an orientation direction per speaker channel, the total number of speakers, output performance of the speakers, etc.

Also, the first image display apparatus 100 according to an embodiment may reconstruct an audio signal that is to be output, based on image information including content of a 360-degree image displayed on a display, a viewing angle of a displayed area of the 360-degree image, a magnification of enlarged or compact displaying of image, etc.

Also, the first image display apparatus 100 according to an embodiment may reconstruct an audio signal that is to be output, based on user information including information of a user's viewpoint regarding a display, etc.

Referring to FIG. 13, for example, the first image display apparatus 100 may reconstruct an audio signal that is to be output, based on the information of the user's viewpoint and the speaker layout information including locations, the number, etc. of the plurality of speakers 1301, 1302, 1303, and 1304 including the speakers 1301 and 1302 included in the first image display apparatus 100 and the speakers 1303 and 1304 respectively included in the second and third image display apparatuses 200 and 300. The first image display apparatus 100 may control the plurality of speakers 1301, 1302, 1303, and 1304 to output the reconstructed audio signal.

According to an example embodiment, when a plurality of image display apparatuses include a combination of a TV and a projector, an output audio signal may be reconstructed, for example, and without limitation, such that an audio signal corresponding to a background sound may be output via a speaker included in the projector, and a human voice may be output via a speaker included in the TV.

Figure 14:
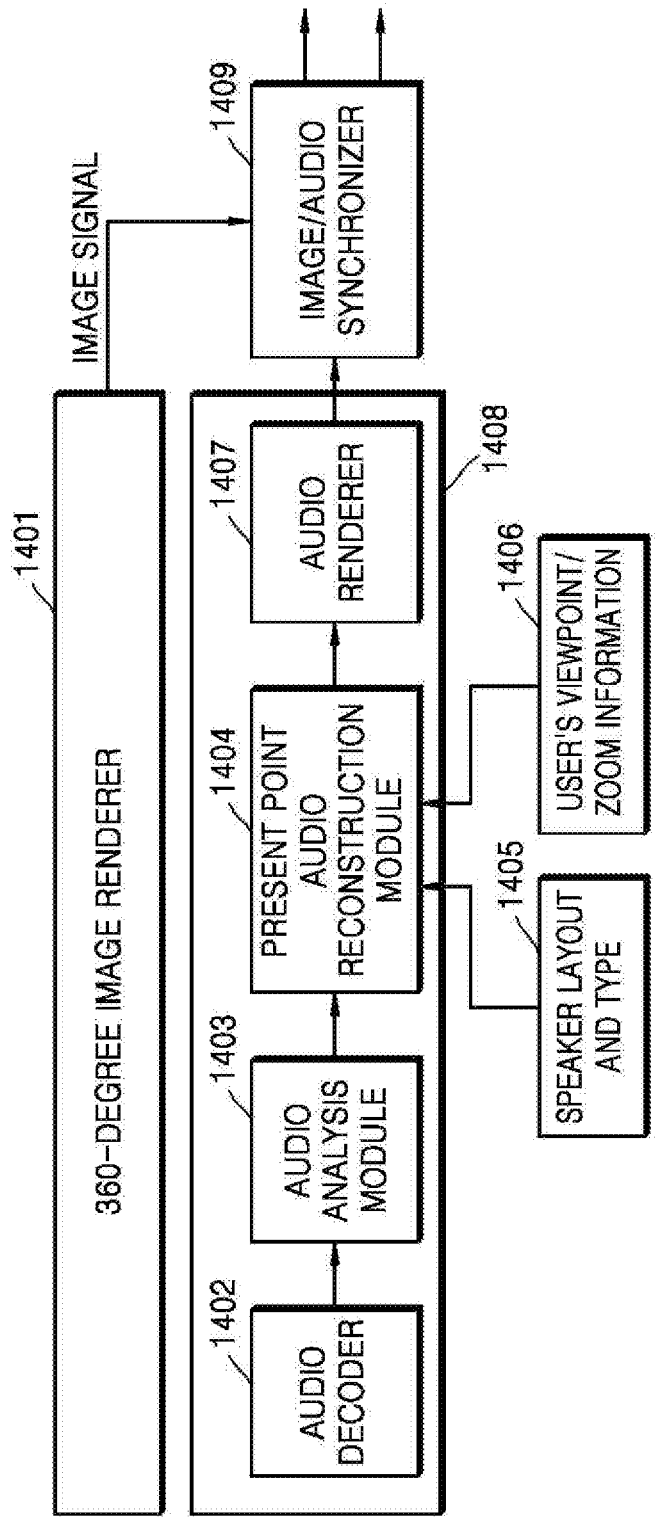
FIG. 14 is a diagram illustrating an example audio output process synchronized to a 360-degree image, according to an example embodiment.

FIG. 14 is a diagram illustrating an example audio output process synchronized to a 360-degree image, according to an example embodiment.

The image display apparatus 100 may include an audio processing module (e.g., including processing circuitry and/or program elements) 1408 including an audio decoder 1402, an audio analyzing module (e.g., including circuitry and/or program elements) 1403, a present point audio reconstruction module (e.g., including circuitry and/or program elements) 1404, and an audio renderer (e.g., including rendering circuitry and/or program elements) 1407.

The audio decoder 1402 according to an embodiment may be a module configured to decode an audio signal that is input. The audio analyzing module 1403 according to an embodiment may include various audio decoding circuitry and/or program elements that analyze the number and a direction of sound sources having directionality, based on the audio signal.

The present point audio reconstruction module 1404 according to an embodiment may include various circuitry and/or program elements that reconstruct an audio signal to correspond to a present point image, based on speaker layout information 1405, user information 1406, image information, etc. The audio renderer 1407 according to an embodiment may include various circuitry and/or program elements that render the audio that is reconstructed to correspond to the present point.

Also, an image/audio synchronizer 1409 may include various circuitry and/or program elements that generate an output audio and an output image by synchronizing the rendered audio signal with an image signal rendered via an image renderer 1404.

The method of the present disclosure may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that the various example embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope of the disclosure as defined by the following claims and their equivalents.

What is claimed is:

1. A method performed by a first image display apparatus comprising a first display and a processor, the method comprising:

obtaining a 360-degree image;
controlling to divide the 360-degree image into a plurality of images comprising a first image and a second image;
displaying, on the first display, the first image corresponding to a first area of the 360-degree image; and
controlling an external second image display apparatus, comprising a second display, to display the second image corresponding to a second area of the 360-degree image on the second display which is located adjacent to the first display, the second area being adjacent to the first area on the 360-degree image, and
in response to a predetermined user input, changing a location of the first area, and in synchronization to the changed location of the first area, changing a location of the second area to be adjacent to the changed first area.

2. The method of claim 1, wherein the controlling of the second image display apparatus to display the second image comprises transmitting the 360-degree image and area extraction information to the second image display apparatus or to a server, and
the second image comprises an image extracted from the 360-degree image by the second image display apparatus or the server, based on the area extraction information.

3. The method of claim 2, wherein the area extraction information comprises at least one of:
location information of the first area;
size information of the first area;
display magnification information of the first area;
reproduction point information of the first area of the 360-degree image; and
information regarding an area adjacent to the first area.

4. The method of claim 1, further comprising:
changing at least one of: a location, a size, and a display magnification of the first area, based on a received input with respect to the first area of the 360-degree image, and displaying the first image on the first display based on the changes to the first area; and
controlling the second image display apparatus to set an area adjacent to the changed first area as the second area and display a second image corresponding to the changed second area.

5. The method of claim 1, wherein the obtaining of the 360-degree image comprises receiving the 360-degree image from a server, and
the 360-degree image received from the server comprises a planar 360-degree image generated by mapping a sphere-shaped 360-degree image to a planar shape.

6. The method of claim 5, wherein the obtaining of the 360-degree image further comprises restoring the planar 360-degree image to the sphere-shaped 360-degree image and extracting the first image corresponding to the first area.

7. The method of claim 1, further comprising:
reproducing the 360-degree image, and
outputting audio in synchronization with a reproduction point of the 360-degree image.

8. The method of claim 7, wherein the outputting of the audio comprises reconstructing an audio signal to be output via at least one speaker of the first image display apparatus and at least one speaker of the second image display apparatus, based on at least one of:
location information of the at least one speaker of the first image display apparatus,
location information of the at least one speaker of the second image display apparatus,
information of a user's viewpoint, and
image information.

9. A non-transitory computer-readable recording medium having embodied thereon a program, which when executed by a computer, performs the method of claim 1.

10. A first image display apparatus comprising:
a first display; and
a processor configured to:
obtain a 360-degree image,
divide the 360-degree image into a plurality of images comprising a first image and a second image;
control the first display to display the first image corresponding to a first area of the 360-degree image, and
control an external second image display apparatus, comprising a second display, to display the second image corresponding to a second area of the 360-degree image on the second display which is located adjacent to the first display, the second area being adjacent to the first area on the 360-degree image, and
in response to a predetermined user input, change a location of the first area, and in synchronization to the changed location of the first area, change a location of the second area to be adjacent to the changed first area.

11. The first image display apparatus of claim 10, wherein the controller is further configured to transmit the 360-degree image and area extraction information to the second image display apparatus or to a server, and
the second image comprises an image extracted from the 360-degree image by the second image display apparatus or the server, based on the area extraction information.

12. The first image display apparatus of claim 11, wherein the area extraction information comprises at least one of:
location information of the first area;
size information of the first area;
display magnification information of the first area;
reproduction point information of the first area of the 360-degree image; and
information regarding an area adjacent to the first area.

13. The first image display apparatus of claim 10, wherein the controller is further configured to change at least one of: a location, a size, and a display magnification of the first area, based on a received input with respect to the first area of the 360-degree image, and to display the first image on the first display based on the changes to the first area, and
the controller is further configured to control the second image display apparatus to set an area adjacent to the changed first area as the second area and to display a second image corresponding to the changed second area.

14. The first image display apparatus of claim 10, wherein the controller is further configured to receive the 360-degree image from a server, and
the 360-degree image received from the server comprises a planar 360-degree image generated by mapping a sphere-shaped 360-degree image to a planar shape.

15. The first image display apparatus of claim 14, wherein the controller is further configured to restore the planar 360-degree image to the sphere-shaped 360-degree image and to extract the first image corresponding to the first area.

16. The first image display apparatus of claim 10, further comprising:
at least one speaker,
wherein the controller is further configured to:
reproduce the 360-degree image, and
output audio in synchronization with a reproduction point of the 360-degree image.

17. The first image display apparatus of claim 16, wherein the controller is further configured to reconstruct an audio signal to be output via the at least one speaker of the first image display apparatus and at least one speaker of the second image display apparatus, based on at least one of:
- location information of the at least one speaker of the first image display apparatus,
- location information of the at least one speaker of the second image display apparatus,
- information of a user's viewpoint, and
- image information.

* * * * *